US012068696B2

(12) United States Patent
Hari et al.

(10) Patent No.: US 12,068,696 B2
(45) Date of Patent: Aug. 20, 2024

(54) METHODS AND SYSTEMS RELATED TO OPERATION OF A SWITCHING POWER CONVERTER

(71) Applicant: SEMICONDUCTOR COMPONENTS INDUSTRIES, LLC, Phoenix, AZ (US)

(72) Inventors: Ajay Karthik Hari, Scottsdale, AZ (US); Alan David Finkel, Chandler, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 344 days.

(21) Appl. No.: 17/447,913

(22) Filed: Sep. 16, 2021

(65) Prior Publication Data

US 2022/0094275 A1    Mar. 24, 2022

Related U.S. Application Data

(60) Provisional application No. 62/706,969, filed on Sep. 22, 2020.

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC .. H02M 3/33592; H02M 1/08; H02M 1/0035; H02M 1/0022; H02M 1/0009
See application file for complete search history.

(56) References Cited

U.S. PATENT DOCUMENTS

| | | | |
|---|---|---|---|
| 6,127,746 A | 10/2000 | Clemente | |
| 6,459,324 B1 | 10/2002 | Neaucsu et al. | |
| 9,007,102 B2 | 4/2015 | Lobsiger et al. | |
| 10,469,068 B1* | 11/2019 | Liu | H02M 3/1588 |
| 2020/0177090 A1* | 6/2020 | Braz | H03K 17/164 |
| 2021/0159898 A1* | 5/2021 | Westwick | H02M 1/08 |
| 2022/0200459 A1* | 6/2022 | Duvnjak | H02M 3/156 |
| 2023/0246558 A1* | 8/2023 | Radic | H02M 3/33507 |
| | | | 363/21.14 |

* cited by examiner

*Primary Examiner* — Kyle J Moody
(74) *Attorney, Agent, or Firm* — Dickinson Wright PLLC; Mark E. Scott

(57) ABSTRACT

Operation of a switching power converter, such as to reduce voltage spikes on the secondary side of switching power converters. One example is a method of operating a switching power converter, the method comprising: sensing, by a controller of a switching power converter, a strength-selection signal; and driving, by the controller within a plurality of switching cycles, a control input of a primary electrically-controlled switch, the driving in each switching cycle at a drive strength based on the strength-selection signal.

20 Claims, 4 Drawing Sheets

METHODS AND SYSTEMS RELATED TO OPERATION OF A SWITCHING POWER CONVERTER

CROSS-REFERENCE TO RELATED APPLICATIONS

This application claims the benefit of U.S. Provisional App. No. 62/706,969 filed Sep. 22, 2020 titled "Adaptive Gate Drive." The provisional application is incorporated by reference herein as if reproduced in full below.

BACKGROUND

Many types of switching power converters, sometimes referred as switch mode power converters or switched-mode converters, use an isolation transformer to galvanically isolate the input or primary side from the output or secondary side. There are several arrangements possible for use of the transformer, such as forward topologies, flyback topologies, and bridge converters.

Regardless of the precise topology, switching of electrically-controlled switches (e.g., field effect transistors (FETs)) on the primary side may cause voltage spikes on the secondary side. Depending upon the precise arrangement and the operational state of the switching power converter (e.g., input voltage, magnitude of the load), the voltage spikes may have peak voltages at many multiples of the designed output voltage of the switching power converter. To address the voltage spikes, system designers may implement several techniques, such as selecting secondary rectifiers with breakdown voltages higher than the voltage spikes, and use of resistor-capacitor (RC) snubber networks. The cost of secondary rectifiers increases directly proportional to breakdown voltage, and RC snubber networks add cost and component count to the design of the switching power converter.

Any method or system which reduces the peak voltage of voltage spikes would provide a competitive advantage in the marketplace.

SUMMARY

One example is a method of operating a switching power converter, the method comprising: sensing, by a controller of a switching power converter, a strength-selection signal; and driving, by the controller within a plurality of switching cycles, a control input of a primary electrically-controlled switch, the driving in each switching cycle at a drive strength based on the strength-selection signal.

In the example method, driving the control input at the drive strength may further comprise: driving at a first drive strength when the strength-selection signal indicates an input voltage supplied to the switching power converter is above a predetermined threshold; and driving at a second drive strength, higher than the first drive strength, when the strength-selection signal indicates the input voltage is below a predetermined threshold.

In the example method, driving the control input at the drive strength may further comprise: driving at a first drive strength when the strength-selection signal indicates a value indicative of load is below a predetermined threshold; and driving at a second drive strength, higher than the first drive strength, when the strength-selection signal indicates value indicative of load is below the predetermined threshold.

In the example method, driving the control input at the drive strength may further comprise: driving at a first drive strength when the strength-selection signal indicates an input voltage supplied to the switching power converter is above a predetermined threshold and a value indicative of load is below a predetermined threshold; and driving at a second drive strength, higher than the first drive strength, when the strength-selection signal indicates the input voltage is below a predetermined threshold.

In the example method, driving at the drive strength may further comprise conducting current from a voltage rail through a conduction area, the conduction area selected by the controller based on the strength-selection signal.

In the example method, driving at the drive strength may further comprise conducting current from a voltage rail through a control device, wherein a voltage of the voltage rail is selected by the controller based on the strength-selection signal.

Another example is a controller for a switching power converter, the controller comprising: a gate terminal and a sense terminal; a gate-drive controller coupled to the gate terminal and the sense terminal; a PWM controller defining a gate output coupled to the gate-drive controller, and the PWM controller configured to assert and de-assert the gate output in each switching cycle of the switching power converter. The gate-drive controller may be configured to: sense, by way of the sense terminal or the gate terminal, a strength-selection signal; and drive, responsive to each assertion of the gate output, current to the gate terminal, the driving in each switching cycle at a drive strength based on the strength-selection signal.

In the example controller, when the gate-drive controller drives the gate terminal at the drive strength, the gate-drive controller may be further configured to: drive at a first drive strength when the strength-selection signal indicates an input voltage supplied to the switching power converter is above a predetermined threshold; and drive at a second drive strength, higher than the first drive strength, when the strength-selection signal indicates the input voltage is below a predetermined threshold.

In the example controller, when the gate-drive controller drives the gate terminal at the drive strength, the gate-drive controller may be further configured to: drive at a first drive strength when the strength-selection signal indicates a value indicative of load is below a predetermined threshold; and drive at a second drive strength, higher than the first drive strength, when the strength-selection signal indicates value indicative of load is below the predetermined threshold.

In the example controller, when the gate-drive controller drives the gate terminal at the drive strength, the gate-drive controller may be further configured to: drive at a first drive strength when the strength-selection signal indicates an input voltage supplied to the switching power converter is above a predetermined threshold and a value indicative of load is below a predetermined threshold; and drive at a second drive strength, higher than the first drive strength, when the strength-selection signal indicates the input voltage is below a predetermined threshold.

In the example controller, the gate-drive controller may further comprise: a first transistor having a first connection coupled to a voltage rail, a second connection coupled to the gate terminal, and a control input; and a second transistor having a first connection coupled to the voltage rail, a second connection coupled to the gate terminal, and a control input. When the gate-drive controller drives the gate terminal at the drive strength, the gate-drive controller may be further configured to: assert the control input of both the first and second transistors when the strength-selection signal is below a predetermined threshold; and assert the control input the first transistor, and hold de-asserted the control input of the second transistor, when strength-selection signal is above a predetermined threshold.

In the example controller, when the gate-drive controller drives the gate terminal at the drive strength, the gate-drive controller may be further configured to conduct current from a voltage rail through a conduction area, the conduction area selected by the gate-drive controller based on the strength-selection signal.

The example controller may be further configured to change a voltage on a voltage rail of the gate-drive controller based on the strength-selection signal.

Another example is a switching power converter comprising: a primary side; a secondary side; and a controller. The primary side may comprise: a primary winding of a transformer, the primary winding defining a first lead coupled to an input voltage, and a second lead; and a primary electrically-controlled switch having a control input, a first connection coupled to the second lead, and a second connection coupled to a reference voltage on the primary side. The secondary side may comprise: a secondary winding of the transformer, the secondary winding defining a first lead coupled to a voltage output; and a secondary rectifier associated with the secondary winding. The controller may comprise: a gate-drive controller coupled to the control input of the primary electrically-controlled switch and the input voltage; a PWM controller defining a gate output coupled to the gate-drive controller, and the PWM controller configured to assert the gate output in each switching cycle of the switching power converter. The gate-drive controller may be configured to: sense a strength-selection signal; and drive, responsive to each assertion of the gate output, current to the control input of the primary electrically-controlled switch, the driving in each switching cycle at a drive strength based on the strength-selection signal.

In the example switching power converter, when the gate-drive controller drives the gate output at the drive strength, the gate-drive controller may be further configured to: drive at a first drive strength when the strength-selection signal indicates the input voltage is above a predetermined threshold; and drive at a second drive strength, higher than the first drive strength, when the strength-selection signal indicates the input voltage is below a predetermined threshold.

In the example switching power converter, when the gate-drive controller drives the gate output at the drive strength, the gate-drive controller may be further configured to: drive at a first drive strength when the strength-selection signal indicates a value indicative of load is below a predetermined threshold; and drive at a second drive strength, higher than the first drive strength, when the strength-selection signal indicates value indicative of load is below the predetermined threshold.

In the example switching power converter, when the gate-drive controller drives the gate output at the drive strength, the gate-drive controller may be further configured to: drive at a first drive strength when the strength-selection signal indicates the input voltage is above a predetermined threshold and a value indicative of load is below a predetermined threshold; and drive at a second drive strength, higher than the first drive strength, when the strength-selection signal indicates the input voltage is below a predetermined threshold.

In the example switching power converter, when the gate-drive controller drives the control input at the drive strength, the gate-drive controller may be further configured to conduct current from a voltage rail through a conduction area, the conduction area selected by the gate-drive controller based on the strength-selection signal.

In the example switching power converter, the gate-drive controller may further comprise: a first transistor having a control input, a first connection coupled to a voltage rail, and a second connection coupled to the control input of the primary electrically-controlled switch; and a second transistor having a control input, a first connection coupled to the voltage rail, a second connection coupled to the control input of the primary electrically-controlled switch. When the gate-drive controller drives the control input of the primary electrically-controlled switch at the drive strength, the gate-drive controller may be further configured to: assert the control input of both the first and second transistors when the strength-selection signal is below a predetermined threshold; and assert the control input the first transistor, and hold de-asserted the control input of the second transistor, when the strength-selection signal is above a predetermined threshold.

In the example switching power converter, the controller may be configured to change a voltage on a voltage rail of the gate-drive controller based on the strength-selection signal.

BRIEF DESCRIPTION OF THE DRAWINGS

For a detailed description of example embodiments, reference will now be made to the accompanying drawings in which.

DEFINITIONS

Figure 1:
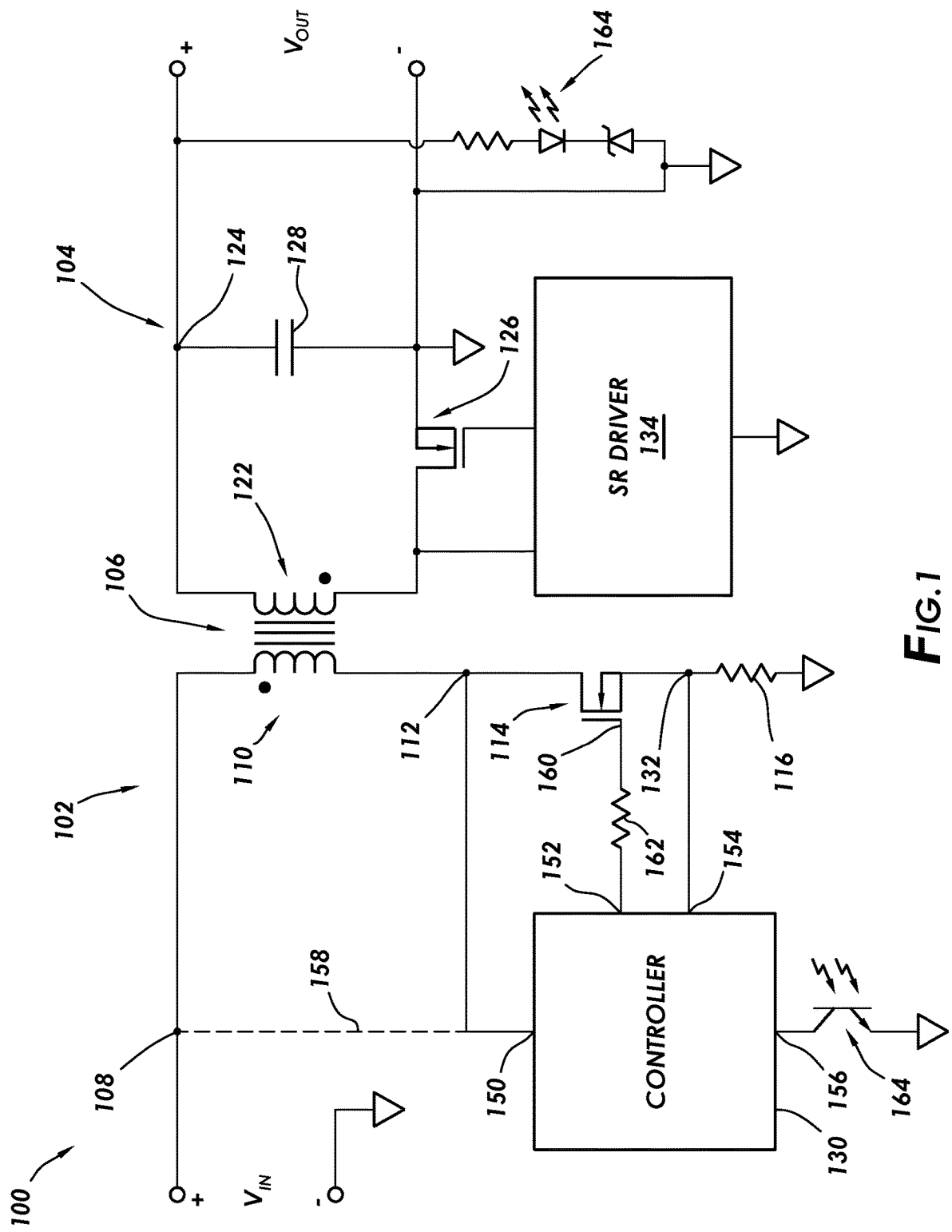
FIG. 1 shows a schematic diagram of a switching power converter arranged for flyback operation, in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Drive strength" in relation to driving the control input of an electrically-controlled switch (e.g., a gate of a field effect transistor, or a base of junction transistor) shall mean a magnitude of current flow provided to the control input as the voltage of the control input ramps toward an asserted state.

"Controller" shall mean, alone or in combination, individual circuit components, an application specific integrated circuit (ASIC), a microcontroller with controlling software, a reduced-instruction-set computing (RISC) with controlling software, a digital signal processor (DSP), a processor with controlling software, a programmable logic device (PLD), or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to methods and systems related to operation of a switching power converter. More particularly, various examples are directed to reducing the peak voltage of voltage spikes produced on the secondary side of switching power converters. More particularly still, various examples are directed to controlling drive strength applied to the control input of a primary switch on the primary side of the switching power converter during certain operational states of the switching power converter, to reduce the peak voltage of voltage spikes generated on the secondary side caused by the change of conductive state of the primary switch.

FIG. 1 shows a schematic diagram of a switching power converter arranged for flyback operation. In particular, the switching power converter 100 comprises a primary circuit or primary side 102 electrically coupled to a secondary circuit or secondary side 104 by way of a transformer 106. The primary side 102 defines a node 108 that is coupled to a direct current (DC) input voltage $V_{IN}$. In the example system the node 108 is also coupled directly to a first lead of a primary winding 110 of the transformer 106. The second lead of the primary winding 110 is coupled to and defines a switch node 112. The switch node 112 (and thus the second lead of the primary winding 110) is coupled to an electrically-controlled switch illustratively shown as a field effect transistor (FET), and hereafter a primary FET 114. In particular, the drain of the primary FET 114 is coupled to the switch node 112, and the source of the primary FET 114 is coupled to common or ground on the primary side 102 by way of a sense resistor 116. The example the primary FET 114 is an N-channel metal oxide semiconductor (MOS) FET. However, in other examples the primary switch may be P-channel MOSFET, or any other suitable device that operates as an electrically-controlled switch, such as FETs referred to as "super-junction" (SJFETs), and gallium nitride (GaN) FETs.

In the example, the primary side 102 comprises a controller 130. The controller 130 defines an input-sense terminal 150, a gate terminal 152, a current-sense terminal 154, and a feedback terminal 156. The input-sense terminal 150 is coupled to the switch node 112, and during periods of time when the primary FET 114 is non-conductive the controller 130 may sense the input voltage $V_{IN}$ by way of the input-sense terminal. In other examples, the input-sense terminal 150 may be coupled directly to the node 108, as shown by dashed line 158. The gate terminal 152 is coupled to the control input of the primary switch, which for the primary FET 114 is the gate 160. For reasons discussed in greater detail below, a resistor 162 may be coupled between the between the gate terminal 152 and the gate 160. Though the controller 130 is shown on the primary-side in the example of FIG. 1, the controller 130 may also be implemented on the secondary side. For example, some controllers are designed, and constructed to control the primary side and the secondary components, including internal electrical isolation.

The current-sense terminal 154 is coupled to the sense node 132. During each charge mode when the gate 160 of the primary FET 114 is asserted and current flows through the primary winding 110 and the sense resistor 116, the controller 130 reads or senses by way of the current-sense terminal 154 a voltage indicative of the current through the primary winding 110. In some example, each charge mode may end when the voltage indicative of current reaches a peak current setpoint, and in some cases the peak current setpoint is a function of the magnitude of the load supplied by the switching power converter 100.

The feedback terminal 156 is coupled to the secondary side 104 to read or sense voltage indicative of the output voltage $V_{OUT}$. In the example, the feedback terminal 156 is coupled to a first portion of an optocoupler 164, the first portion illustrative shown as a junction transistor having a base that is optically driven. The second portion of the optocoupler 164 is coupled to the output voltage $V_{OUT}$ on the secondary side 104, the second portion illustratively show as a light emitting diode. Thus, by way of the feedback terminal 156 the controller 130 receives a voltage indicative of the output voltage (and thus the load); however, other methods and systems may be used by the controller 130 to receive indications of the output voltage (e.g., by sensing voltage reflected across the transformer 106 during the discharge mode), and thus the feedback terminal 156 need not be implemented in all cases. Additional terminals associated with the controller 130 will be present, such as a terminal connected to a reference voltage on the primary side (e.g., ground or common), and additional terminals for controlling an active snubber network if used, but the additional terminals are not shown so as not to further complicate the figure.

The example secondary side 104 comprises a secondary winding 122 of the transformer 106. A first lead of the secondary winding 122 is coupled to an output node 124 of the secondary side 104 and thus the positive terminal of the output voltage $V_{OUT}$. The second lead of the secondary winding 122 is coupled to a synchronous rectifier in the example form a FET, and hereafter SR FET 126. In particular, the second lead of the secondary winding 122 is coupled to the drain of SR FET 126, and the source of SR FET 126 is coupled to the reference voltage on the secondary side 104 (e.g., common). The example secondary side 104 also comprises a capacitor 128 coupled between the output node 124 and the reference voltage on the secondary side 104, which reference voltage need not be the same as the reference voltage for the primary side 102 because of the isolation aspects of the transformer 106.

Further in the example system, the secondary side 104 comprises a synchronous rectifier driver, hereafter SR driver 134. The SR driver 134 is coupled to the gate of the SR FET 126, and is also coupled to the drain of the SR FET 126. By monitoring the voltage on the drain of the SR FET 126, the SR driver 134 controls when the SR FET 126 is conductive and non-conductive. The specification now turns to various operational states or modes of the switching power converter 100.

Transferring energy from the primary side 102 to the secondary side 104 in the example system may be conceptually considered a two-step process. In particular, the switching power converter 100 first enters a charge mode in which energy is stored in the field of the transformer 106. More particularly, the example switching power converter 100 enters the charge mode by the controller 130 asserting the gate 160 and thus making the primary FET 114 conductive. When the primary FET 114 is conductive, current flows from the input voltage $V_{IN}$, through the primary winding 110, through the primary FET 114, through the sense resistor 116, and then to the reference voltage on the primary side 102. The current through the primary winding 110 creates a voltage on the secondary winding 122. However, in the example shown the transformer 106 is arranged for flyback operation, and during the charge mode the voltage on the secondary winding 122 is higher on the connection or lead coupled to the drain of the SR FET 126 than on the connection or lead coupled to the output node 124 (in conformance with the dot convention shown in the figure). During the charge mode the SR FET 126 is non-conductive, and thus no current flows in the secondary winding 122; rather, energy is stored in the field of the transformer 106 during the charge mode. The current through the primary winding 110 ramps for a predetermined period of time, or ramps until the current reaches a peak current setpoint, and then the controller 130 de-asserts the gate 160 thus making the primary FET 114 non-conductive, ending the charge mode and beginning the discharge mode.

The second step in transferring energy is the discharge mode. Once the primary FET 114 is made non-conductive, the voltage on the secondary winding 122 reverses polarity, the SR driver 134 makes the SR FET 126 conductive, and current flows through the secondary winding 122 to the capacitor 128 and the output node 124 to supply a load (not specifically shown). The period of time in which current is flowing through the secondary winding is referred to as the discharge mode. That is, the energy stored during the immediately previous charge mode is provided from the transformer 106 in the form of voltage and current at the secondary winding 122 during the discharge mode. More particularly still, the collapsing field associated with the transformer 106 provides voltage and current to the secondary winding 122 during the discharge mode. At some point after the discharge mode ends a new charge mode begins, and the switching cycle continues with each charge mode and related discharge mode used to transfer energy across the transformer 106 and to the output voltage $V_{OUT}$. A single charge mode and an immediately subsequent discharge mode is a single switching cycle of the switching power converter 100, and a series of such charge and discharge modes considered together are thus switching cycles of the switching power converter. Relatedly, a single assertion of the gate 160 of the primary FET 114 and an immediately subsequent de-assertion of the gate 160 of the primary FET 114 is a single switching cycle of the switching power converter 100, and a series of such assertion and de-assertion events considered together are thus switching cycles of the switching power converter.

The example switching power converter 100 may operate in either a continuous conduction mode (CCM) or a discontinuous conduction mode (DCM). Considering first the continuous conduction mode, which may be used during high loads. In the continuous conduction mode current flows through either the primary winding 110 or the secondary winding 122 at all times. For example, in the continuous conduction mode each discharge mode of the transformer 106 ends prior to the field associated with the transformer 106 fully collapsing. More particularly still, in the continuous conduction mode the controller 130 makes the primary FET 114 conductive, thus beginning the next charge mode, before the current flow in the secondary winding 122 reaches zero in the discharge mode. Even though current may still be flowing in the secondary winding 122 at the instant the primary FET 114 begins the transition to being conductive, as soon as current starts to flow in the primary winding 110 the voltage on the secondary winding 122 reverses. When the SR driver 134 senses the voltage change (e.g., by monitoring the voltage on the drain of the SR FET 126), the SR driver 134 makes the SR FET 126 non-conductive. The example switching power converter 100 may use additional circuits on the primary side 102, such as an active or passive snubber circuit, to reduce the switching losses associated with the primary FET 114 during the continuous conduction mode, but these additional circuits are not shown so as not to unduly complicate the figure.

Still referring to FIG. 1, and now consider the discontinuous conduction mode, which may be used during light or low loads. In the discontinuous conduction mode current flow in the secondary winding 122 reaches zero, and remains at zero for a period of time before the next charge mode begins. Thus, unlike the continuous conduction mode, in the discontinuous conduction mode there are periods of time when no current is flowing in either the primary winding 110 or the secondary winding 122 (notwithstanding parasitic oscillations). More particularly still, in the discontinuous conduction mode the current in the secondary winding 122 reaches zero, and responsive thereto the SR driver 134 makes the SR FET 126 non-conductive. However, because of the reactive components on both the primary side 102 and the secondary side 104, various parasitic oscillations occur. For example, after the current in the secondary winding 122 reaches zero (i.e., the field associated with the transformer 106 has fully collapsed), the voltage at the switch node 112 on the primary side 102 starts a damped oscillation. A similar oscillation occurs at the drain of the SR FET 126.

In the discontinuous conduction mode the next charge mode may begin at any time after the current in the secondary winding 122 reaches zero. In example cases the next charge mode begins in a "valley" of the parasitic oscillation of the voltage at the switch node 112. That is, the controller 130 may monitor voltage at the switch node 112 in any suitable form, such as by way of the input-sense terminal 150 or by monitoring voltage induced on the gate of the primary FET 114 caused by the oscillations. When the voltage reaches or approaches a low voltage "valley" as part of the oscillation, the controller 130 may make primary FET 114 conductive again, starting the next charge mode. Starting the next charge mode in a valley of the voltage oscillation at the switch node 112 may be referred to as quasi-resonant operation or valley mode. Making the primary FET 114 conductive in a valley of the voltage oscillation reduces the voltage across the primary FET 114 when the primary FET 114 is made conductive, which reduces switching losses. Depending upon the magnitude of the load coupled at the output voltage $V_{OUT}$, the controller 130 picks a valley of the voltage oscillation at the switch node 112 within which to assert the gate the primary FET 114, and thus begin the next charge mode. As load decreases, the valley selected may be later in time from when the current flow through the secondary winding 122 ceases. If the load continues to drop, the example controller 130 may enter a fold back mode in which the switching frequency is reduced (e.g., from 80 kilo-Hertz (kHz) to 25 kHz). If load continues to drop, the example controller 130 may enter a cycle skip mode, in which one or more switching cycles are skipped or not implemented.

The transition of the primary FET 114 from non-conductive to conductive causes voltage spikes on the secondary winding 122. In particular, each transition to a charge mode causes a momentary voltage spike on the secondary winding 122. Because the SR FET 126 is non-conductive during the charge mode, the SR FET 126 is thus selected to withstand the momentary voltage spike, and/or snubber circuits are implemented on the secondary side 104 to reduce the voltage spikes experienced by the SR FET 126. The magnitude of each voltage spike is related to several factors: the magnitude of the input voltage $V_{IN}$; how quickly the primary FET 114 transitions from non-conductive to fully conductive; and the voltage across the primary FET 114 at each transition. Each factor is addressed in turn.

First considering magnitude of the input voltage $V_{IN}$. For a fixed transition time of the time of the primary FET 114 from non-conductive to fully conductive, and putting aside consideration of parasitic oscillations at the switch node 112, the greater the magnitude of the input voltage $V_{IN}$, the higher the peak voltage of the voltage spikes on the secondary side 104 during each transition of the primary FET 114 from non-conductive to fully conductive. It follows, the lower the magnitude of the input voltage $V_{IN}$, the lower the peak voltage of the voltage spikes on the secondary side 104 during each transition of the primary FET 114 from non-conductive to fully conductive.

Now turning to how quickly the primary FET 114 transitions from non-conductive to fully conductive. For a fixed input voltage $V_{IN}$, and again putting aside consideration of parasitic oscillations at the switch node 112, the faster the transition of the primary FET 114 from non-conductive to fully conductive, the higher the peak voltage of the voltage spikes on the secondary side 104. Oppositely, the slower the transition of the primary FET 114 from non-conductive to fully conductive, the lower the peak voltage of the voltage spikes on the secondary side 104.

The voltage across the primary FET 114 at each transition has two contributing factors—the magnitude of the input voltage $V_{IN}$, and in the discontinuous conduction mode the instantaneous state of the parasitic oscillations at the switch node 112. That is, in high load situations in the continuous conduction mode, active or passive snubber circuits on the primary side 102 reduce the voltage across the primary FET 114 at each transition, in some cases reducing the voltage to be close to or at zero (e.g., zero-voltage switching or ZVS), and thus voltage spikes on the secondary side 104 have a lower magnitude and are of less concern. In lighter load situations in which the switching power converter 100 is operating in the discontinuous conduction mode, such as in valley mode, the primary FET 114 transitions from non-conductive to fully conductive in a valley of the parasitic oscillation at the switch node 112. Switching in valley mode reduces the voltage across the primary FET 114 at each transition, but may not fully reach zero-voltage switching. Inasmuch as the parasitic oscillations ring down, a voltage envelope of the damped oscillation at the switch node asymptotically approaches the input voltage $V_{IN}$. Selection of successively later valleys results in successively higher voltage across the primary FET 114 at the transition, and thus later valley selection results in greater magnitude voltage spikes on the secondary side 104. When the switching power converter 100 moves to frequency fold back and/or cycle skip, the primary FET 114 transitions independent of the instantaneous voltage at the switch node 112, and thus some transitions may occur when the voltage across the primary FET 114 is greater than the input voltage $V_{IN}$ as caused by the parasitic oscillations.

Inasmuch as the input voltage $V_{IN}$ applied to a particular switching power converter is fixed for extended periods of time, and magnitude of the load is the primary factor in the valley selection or transition to fold back and cycle skip, during operation in the discontinuous conduction mode, slowing the transition of the primary FET 114 seems to provide the best control of the magnitude of the voltage spikes on the secondary side 104. However, the slower the transition time of the primary FET 114, the greater the internal switching losses experienced by the primary FET 114. It follows that a circuit designer balances several factors in deciding how quickly the primary FET 114 should transition from non-conductive to fully conductive in each switching cycle. In related-art converters, the selection of how quickly the primary FET 114 transitions from non-conductive to fully conductive is set and controlled by the magnitude of the resistance implemented by resistor 162. Higher resistance results in longer charge time of the capacitance of the gate 160, and thus increased time of transition from non-conductive to fully conductive. Oppositely, lower resistance results in shorter charge time of the capacitance of the gate 160, and thus decreased time of transition from non-conductive to fully conductive. However, implementing a single resistance for all operational states of the power converter results overall decreased efficiency.

The inventors of the present specification have found that better overall efficiency can be achieved when the drive strength of the drive signal supplied to the gate terminal 152 by the controller 130 is variable and controlled as a function of the state of the switching power converter 100. In particular, in various examples the controller 130 senses a value indicative of input voltage $V_{IN}$, and drives the gate 160 of the primary FET 114 in each switching cycle at a drive strength based on strength-selectin signal, such as the value indicative of input voltage $V_{IN}$. For example, when the input voltage $V_{IN}$ is above a predetermined threshold (e.g., above 180V, such as 230V in operation in Europe), the example controller 130 drives the gate terminal 152 and thus the gate 160 at a first drive strength. When the input voltage $V_{IN}$ is below the predetermined threshold (e.g., below 180V, such as 120V in operation in the United States), the example controller 130 drives the gate terminal 152 and thus the gate 160 at a second drive strength higher than the first drive strength. By using a lower drive strength when the input voltage $V_{IN}$ is above the predetermined threshold, the peak voltage of the voltage spike may remain below the breakdown voltage of the SR FET 126, possibly at the expense of increased switching loss of the SR FET 126. Oppositely, by using a higher drive strength when the input voltage $V_{IN}$ is below the predetermined threshold, the peak voltage of the voltage spike may still remain below the breakdown voltage of the SR FET 126, and switching loss of the SR FET 126 is decreased. A resistor 162 may be used in example cases to set a minimum charge time for purposes of reducing electromagnetic interference (EMI), but additional drive strength control is implemented in the controller 130.

The discussion in the immediately previous paragraph implicitly assumed bi-level operation as between lower input voltage $V_{IN}$ and higher input voltage $V_{IN}$. However, in other cases the drive strength may have more than two levels as a function of input voltage $V_{IN}$, and in some examples may be a continuous function of the input voltage $V_{IN}$. For example, even for an input voltage "fixed" by the magnitude of the AC supply voltage (e.g., 120V, 230V), voltage may fluctuate based on factors external to the switching power converter 100. Thus, in yet still further examples the drive strength used for each transition of the primary FET 114 from non-conductive to fully conductive may be indirectly proportional to the input voltage $V_{IN}$ over a range of voltages. As an example, as the instantaneous input voltage $V_{IN}$ goes up, the drive strength goes down to keep the magnitude of the voltage spike below the breakdown voltage of the SR FET 126. And oppositely, as the instantaneous input voltage $V_{IN}$ goes down, the drive strength goes up to reduce the switching losses of the primary FET 114, yet keeping the magnitude of the voltage spike below the breakdown voltage of the SR FET 126.

In addition to, or in place of, selecting the drive strength based on the input voltage $V_{IN}$, in various examples the controller 130 senses a strength-selection signal in the form of a value indicative of load supplied by the switching power converter 100, and drives the gate 160 of the primary FET 114 in each switching cycle at a drive strength selected based on the value indicative load. For example, when load is below a predetermined threshold (e.g., operating in a late valley mode, frequency fold back, or cycle skip mode), the controller 130 drives the gate terminal 152 and thus the gate 160 at a first drive strength. When the load is above the predetermined threshold (e.g., operating in continuous conduction mode, or an early valley mode), the example controller 130 drives the gate terminal 152 and thus the gate 160 at a second drive strength higher than the first drive strength. By using a lower drive strength when load is below predetermined threshold, the peak voltage of the voltage spike may remain below the breakdown voltage of the SR FET 126, possibly at the expense of increased switching loss of the SR FET 126. Oppositely, by using a higher drive strength when load is above the predetermined threshold, other systems and circuits (e.g., switching in early valley mode, a primary-side snubber circuit) ensure voltage across the primary FET 114 is low at the transition from non-conductive to fully conductive. Thus, the voltage spike may remain below the breakdown voltage of the SR FET 126, and switching loss of the primary FET 114 is decreased.

The discussion in the immediately previous paragraph implicitly assumed bi-level operation as between lower load and higher load. However, in other cases the drive strength may have more than two levels as a function of load. Specifically considering the valley mode, the drive strength used may be indirectly proportional to the valley number selection for beginning the next charge mode. For example, during operational states in which the controller 130 selects any one of first through fifth valleys of the parasitic oscillation at the switch node 112, the controller 130 may drive a first drive strength, and during operational states in which the controller 130 selects any one of sixth or greater valleys of the parasitic oscillation at the switch node 112, the controller 130 may drive a second drive strength lower than the first drive strength. Further still, the drive strength may be different for each valley. For example, the during operational states in which the controller 130 selects the first valley the controller 130 may drive a first drive strength, during operational states in which the controller 130 selects the second valley the controller 130 may drive a second drive strength lower than the first drive strength, during operational states in which the controller 130 selects the third valley the controller 130 may drive a third drive strength lower than the second drive strength, and so on. During frequency fold back and cycle skip, the controller 130 may select a drive strength lower than any drive strength in the continuous conduction mode, and lower than any drive strength used for any valley selection.

The discussion to this point addressed the drive strength relationship to input voltage $V_{IN}$, and separately addressed drive strength relationship to load. However, in yet still further cases the strength-selection signal may be based on both input voltage $V_{IN}$ and load when selecting and implementing a drive strength for each transition of the primary FET 114 from non-conductive to fully conductive. In particular, in further examples the controller 130 may sense both a value indicative of input voltage $V_{IN}$ and a value indicative of load, in any of the example forms discussed above. The controller 130 then selects and implements a drive strength selected based on the value indicative of input voltage $V_{IN}$ and the value indicative of load considered together. For example, the controller 130 may: drive at a first drive strength when the value indicative of input voltage indicates an input voltage $V_{IN}$ is above a predetermined threshold and the value indicative of load indicates a load supplied by the switching power converter is below a predetermined threshold; and drive at a second drive strength, higher than the first drive strength, when the value indicative of input voltage indicates the input voltage is below a predetermined threshold. For example, when the input voltage $V_{IN}$ is high (e.g., 230V), and load is low (e.g., operating in a late valley mode, frequency fold back, or cycle skip mode), the controller 130 drives the gate terminal 152 and thus the gate 160 at a first drive strength. When the load is above the predetermined threshold (e.g., operating in continuous conduction mode, or an early valley mode), the example controller 130 drives the gate terminal 152 and thus the gate 160 at a second drive strength higher than the first drive strength. By using a lower drive strength in the case of high input voltage $V_{IN}$ and low load, the peak voltage of the voltage spike may remain below the breakdown voltage of the SR FET 126. Oppositely, by using a higher drive strength in the case of high load, in some cases independent of input voltage $V_{IN}$, other systems and circuits (e.g., early valley switching, the primary-side snubber circuit) ensure voltage across the primary FET 114 is low at the transition from non-conductive to fully conductive. Thus, the voltage spike may still remain below the breakdown voltage of the SR FET 126, and switching loss of the primary FET 114 is decreased.

Figure 2:
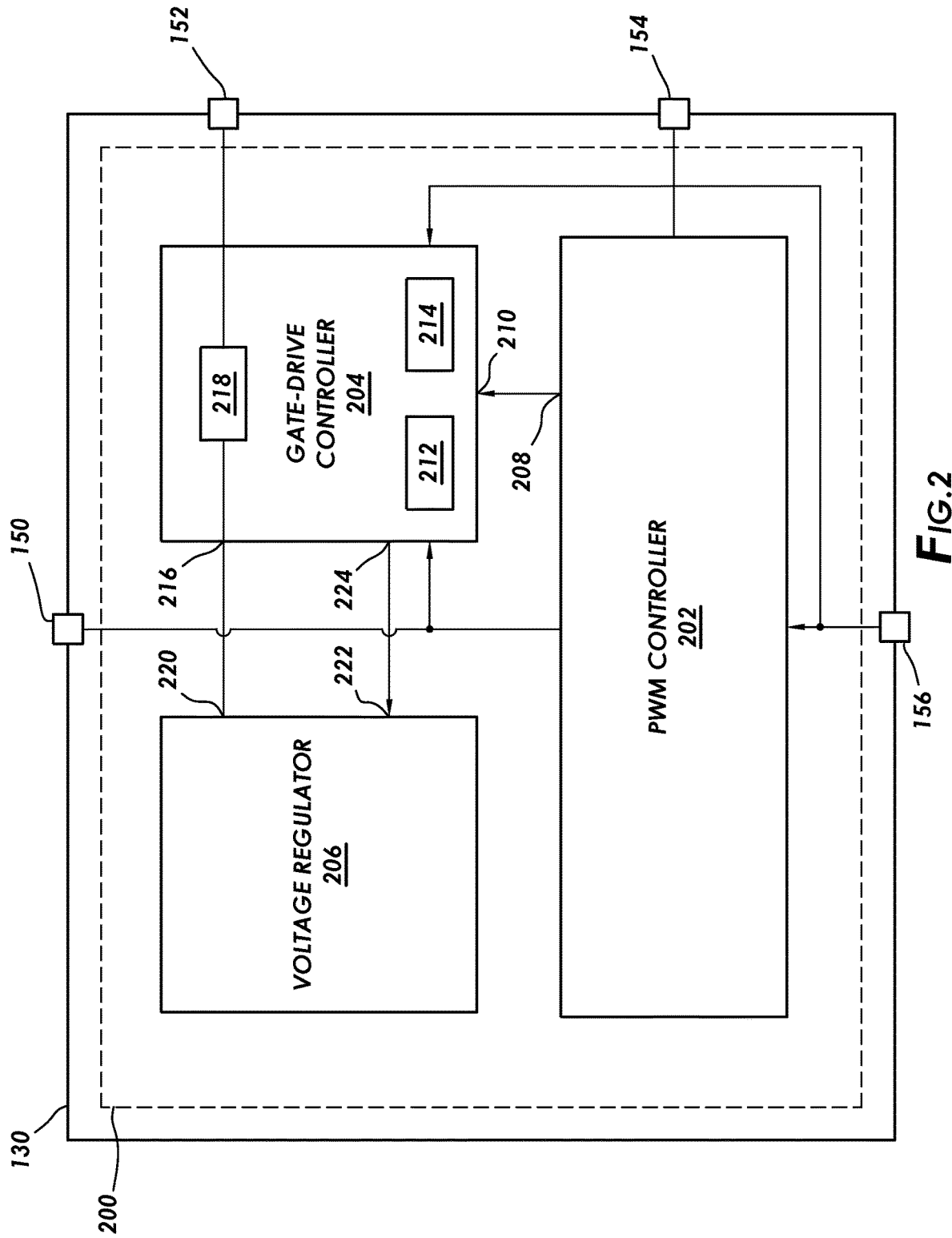
FIG. 2 shows a block diagram of a controller in accordance with at least some embodiments.

FIG. 2 shows a block diagram of a controller in accordance with at least some embodiments. In particular, the controller 130 may comprise electrical devices and circuits monolithically created on a substrate 200 and encapsulated within packaging; however, the functionality of the various components may be embodied on multiple substrates co-packaged (e.g., multi-chip module) and electrically coupled to each other and coupled the various terminals. The example controller 130 defines the input-sense terminal 150, the gate terminal 152, the current-sense terminal 154, and the feedback terminal 156. The example terminals are electrical connections exposed and accessible through the packaging. Additional terminals will be present (e.g., power terminal, reference voltage terminal), but these additional terminals are not shown so as not to unduly complicate the figure.

The various functional components of the controller 130 may be conceptually, though not necessarily physically, divided into a pulse-width modulation controller (hereafter PWM controller 202), a gate-drive controller 204, and a voltage regulator 206. Additional components will be present, but those additional components are not shown so as not to unduly complicate the figure. The PWM controller 202 is coupled to the input-sense terminal 150, the current-sense terminal 154, and the feedback terminal 156. The PWM controller 202 also defines a gate output 208 coupled to the gate-drive controller 204. The PWM controller 202 is configured to assert and de-assert the gate output 208 to implement switching cycles of the switching power converter 100 (FIG. 1). The length of each assertion of the gate output 208 may be controlled based on time or a signal indicative of primary current sensed through the current-sense terminal 154. The timing for assertion of the gate output 208 may be controlled by the PWM controller 202 based on a signal indicative of output voltage or load sensed by way of the feedback terminal 156. The PWM controller 202 may implement the many operational modes of the overall switching power converter 100 (FIG. 1), such as the continuous conduction mode, and the variety of discontinuous conduction modes (e.g., valley mode, frequency fold back, and cycle skip).

The example gate-drive controller 204 is coupled to the input-sense terminal 150, the gate terminal 152, and the feedback terminal 156. Moreover, the gate-drive controller 204 defines a gate input 210 coupled to the gate output 208. In example systems, the gate-drive controller 204 is configured to sense a signal indicative of input voltage $V_{IN}$ applied to the switching power converter 100 (FIG. 1), and store a value indicative of input voltage 212. The value indicative of input voltage 212 may take any suitable form, such as a digital value stored in a register or an analog voltage stored on a capacitor. The value indicative of input voltage 212 is an example of a strength-selection signal and/or a contributor to the strength-selection signal. In the example shown, the gate-drive controller 204 senses the signal indicative of the input voltage $V_{IN}$ by way of the input-sense terminal 150; however, the gate-drive controller 204 may sense and create, or be provided, the value indicative of input voltage from any suitable source. For example, the gate-drive controller 204 may sense a signal through the gate terminal 152, or may be provided the value indicative of input voltage from the PWM controller 202. Regardless of the source of the value indicative of input voltage, the example gate-drive controller 204 is configured to drive the gate terminal in each switching cycle at a drive strength based on the value indicative of input voltage, with the driving in any of the example forms discussed above.

In further example systems, the gate-drive controller 204 is configured to sense a signal indicative of load supplied by the switching power converter 100 (FIG. 1), and store a value indicative of load 214. The value indicative of load 214 may take any suitable form, such as a digital value stored in a register or an analog voltage stored on a capacitor. The value indicative of load 214 is an example of a strength-selection signal and/or a contributor to the strength-selection signal. In the example shown, the gate-drive controller 204 may sense the signal indicative of load by way of the feedback terminal 156; however, the gate-drive controller 204 may sense and create, or be provided, the value indicative of load from any suitable source. For example, the gate-drive controller 204 may be provided the value indicative of load from the PWM controller 202 based on the operational state implemented by the PWM controller 202 (e.g., continuous conduction mode, early valley mode, later valley mode, frequency fold back, cycle skip). Regardless of the source of the value indicative of load 214, the gate-drive controller 204 is configured to drive the gate terminal 152 in each switching cycle at a drive strength based on the value indicative of load, with the driving in any of the example forms discussed above. Further in example systems, the gate-drive controller 204 may be configured to drive the gate terminal 152 in each switching cycle at a drive strength based on the value indicative of input voltage 212 and the value indicative of load 214, with the driving in any of the example forms discussed above Still referring to FIG. 2, the example gate-drive controller 204 further defines a drive rail 216 coupled to a control device 218. The control device 218, in turn, is coupled to the gate terminal 152. When the gate-drive controller 204 drives the gate terminal 152, the gate-drive controller 204 enables current to flow from the drive rail 216, through the control device 218, and then to the gate terminal 152. In some examples, a drive voltage provided on the drive rail 216 is fixed for all operational modes of the controller 130, and the gate-drive controller 204 controls the drive strength by controlling the rate of current flow through the control device 218. For example, when a higher drive strength is selected by the gate-drive controller 204, a higher rate of current flow through the control device 218 is implemented. And when a lower drive strength is selected, a lower rate of current flow through the control device 218 is implemented. The control of the rate of current flow through the control device may take any suitable form, and example control devices 218 are discussed in greater detail below.

In addition to, or in place of, controlling the rate of current flow through control device 218, the gate-drive controller 204 may also select a drive voltage applied on the drive rail 216. In particular, the example controller 130 further comprises the voltage regulator 206. The example voltage regulator 206 defines a voltage output 220 coupled to the drive rail 216, and a setpoint input 222. The voltage regulator 206 is designed and constructed to provide, on the voltage output 220, a drive voltage having a magnitude selected based on the setpoint input 222. The voltage regulator 206 may take any suitable form, such as switch mode power supply (e.g., non-isolated buck converter), a linear regulator, or combinations. The example gate-drive controller 204 may further define a setpoint output 224 coupled to the setpoint input 222, and upon which the gate-drive controller 204 provides a setpoint for the drive voltage applied the drive rail 216.

Thus, in some examples the gate-drive controller 204 controls the drive strength by controlling the magnitude of the drive voltage applied to the drive rail 216. For example, when a higher drive strength is selected, the gate-drive controller 204 may drive a higher setpoint to the setpoint input 222 of the voltage regulator 206, and the higher setpoint resulting in a higher drive voltage applied to the drive rail 216. And when a lower drive strength is selected by the gate-drive controller 204, the gate-drive controller 204 may drive a lower setpoint to the setpoint input 222 of the voltage regulator 206, and the lower setpoint resulting in a lower drive voltage applied to the drive rail 216.

In yet still further cases, the gate-drive controller 204 may control both the rate of current flow to the gate terminal 152 and the magnitude of the drive voltage applied to the drive rail 216. In particular, when a higher drive strength is selected by the gate-drive controller 204, the gate-drive controller 204 may drive a higher setpoint to the setpoint input 222 of the voltage regulator 206 and set a higher rate of current flow through the control device 218. And when a lower drive strength is selected by the gate-drive controller 204, the gate-drive controller 204 may drive a lower setpoint to the setpoint input 222 of the voltage regulator 206 and set a lower rate of current flow through the control device 218. Depending on the nature of the control device 218, the magnitude of drive voltage applied to the drive rail 216 may also affect the rate of current flow through the control device 218.

Figure 3:
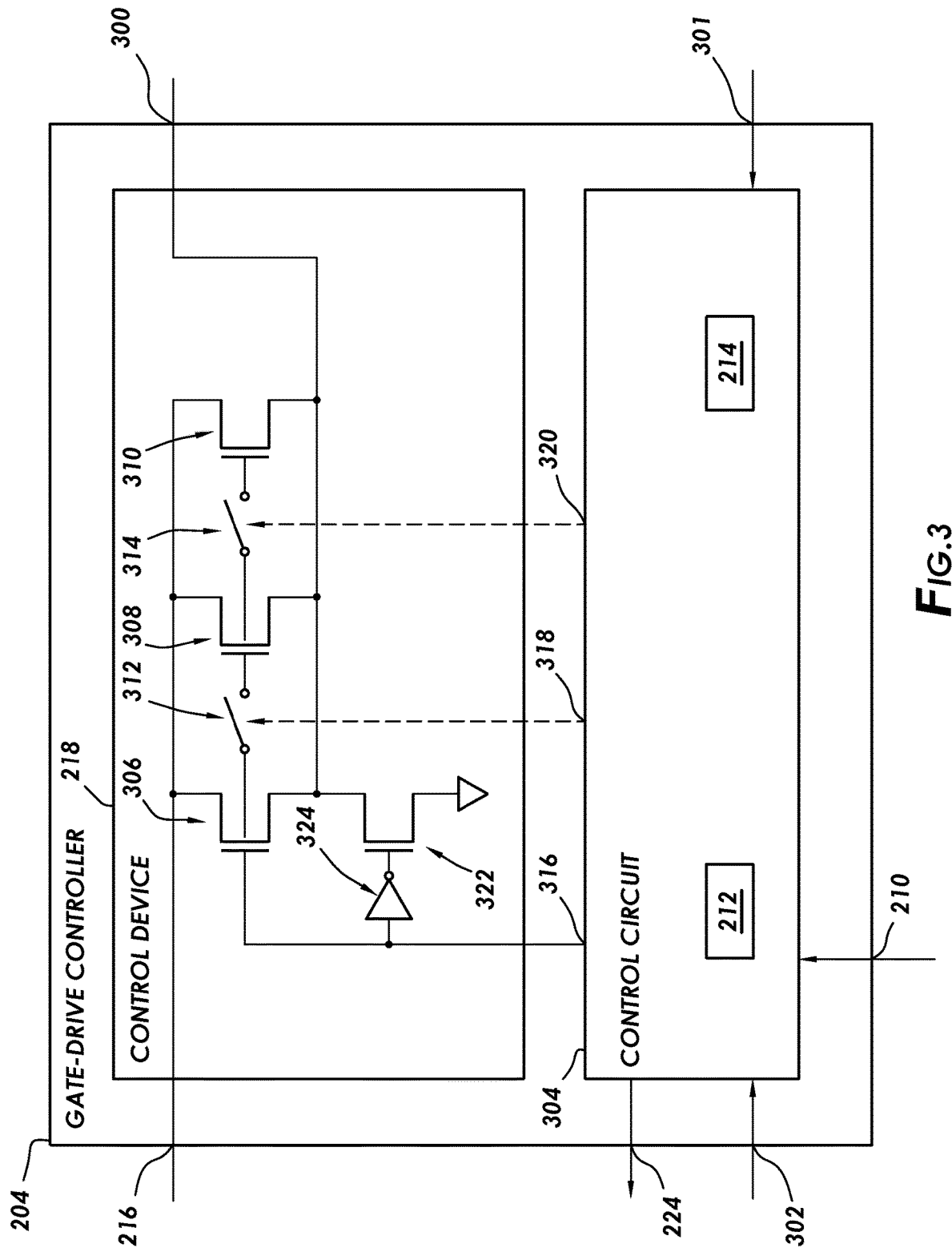
FIG. 3 shows a simplified schematic of a driver in accordance with at least some embodiments.

FIG. 3 shows a simplified schematic of a driver in accordance with at least some embodiments. In particular, the example gate-drive controller 204 defines the drive rail 216, a gate output 300, a load-sense input 301, the gate input 210, a supply-sense input 302, and the setpoint output 224. The gate output 300 is coupled to the gate terminal 152 (FIG. 1), the load-sense input 301 is coupled to the feedback terminal 156 (FIG. 1), and the supply-sense input 302 is coupled to the input-sense terminal 150 (FIG. 1). Internally, the example gate-drive controller 204 defines the control device 218 along with a control circuit 304 (which may be a controller as defined in the definitions sections). The example control circuit 304 defines the setpoint output 224, the load-sense input 301, the supply-sense input 302, and the gate input 210. Further, the example control circuit 304 may include circuits and/or registers that implement storing the value indicative of input voltage 212 and the value indicative of load 214. Based on the value indicative of input voltage 212, and/or the value the indicative of load 214, the control circuit 304 controls the drive strength applied to the gate output 300 in any of the various forms discussed above, such as by controlling the drive voltage supplied to the drive rail 216 and/or controlling the control device 218.

The control device 218 defines the drive rail 216 and the gate output 300. The example control device 218 is designed and constructed to implement at least a portion of the adjustable drive strength by enabling a selectable conduction area for current to flow from the drive rail 216 to the gate output 300. In particular, the example control device 218 defines a FET 306, a FET 308, and a FET 310. The FET 306 defines a first connection or drain coupled to the drive rail 216, a second connection or source coupled to the gate output 300, and a gate. The FET 308 defines a first connection or drain coupled to the drive rail 216, a second connection or source coupled to the gate output 300, and a gate. The FET 310 defines a first connection or drain coupled to the drive rail 216, a second connection or source coupled to the gate output 300, and a gate. The gate of the FET 306 may be coupled to the gate of the FET 308 by way of an electrically-controlled switch illustratively shown as a single-pole single-throw switch, but in most cases implemented as a FET, and hereafter just switch 312. The gate of the FET 308 may be coupled to the gate of the FET 310 by way of an electrically-controlled switch illustratively shown as a single-pole single-throw switch, but in most cases implemented as a FET, and hereafter just switch 314.

Still referring to FIG. 3, the example control circuit 304 defines a drive output 316 coupled to the gate of the FET 306, a drive output 318 coupled to the control input of the switch 312, and a drive output 320 coupled to the control input of the switch 314. Assertion of the drive output 316 asserts the gate of the FET 306, which couples the drive rail 216 to the gate output 300. The FET 306 thus represents a first conduction area (e.g., the cross-sectional conduction area of the FET 306 through which current flows), and thus the FET 306 acting alone represents a first drive strength. To the extent that the control circuit 304 implements a higher drive strength, the control circuit 304 may assert the drive output 318, making the switch 312 conductive, and thus making the FET 308 conductive. Having both the FET 306 and the FET 308 conductive represents a second conduction area and a second drive strength higher than the first drive strength. To the extent that the control circuit 304 implements an even higher drive strength, the control circuit 304 may further assert the drive output 320, making the switch 314 conductive, and thus making the FET 310 conductive. Having all three FETs 306, 308, and 310 conductive represents a third conduction rea and third drive strength higher than both the first and second drive strengths. When the FETs 308 and/or 310 are not used, their gates remain de-asserted.

When the control circuit 304 ends the charge mode within each switching cycle, the control circuit de-asserts the drive output 318, making the FETs 306, 308, and 310 nonconductive. The example control device 218 further defines a FET 322 having a first connection coupled to the gate output 300, a second connection coupled to the reference voltage on the primary side, and a gate. In the example shown in FIG. 3, the gate of the FET 322 is coupled to the drive output 316 by way of a NOT gate 324 to illustrate that the FET 322 is conductive periods opposite those of FETs 306, 308, and 310. Stated otherwise, the FET 322 is conductive during the discharge mode of each switching cycle of the switching power converter 100 (FIG. 1). In practice, and for reasons of powering up into a safe state, the example FETs 306, 308, and 310 may be N-channel FETs that are non-conductive when no voltage is applied to their gates (e.g., similar to a normally-open switch), the FET 322 may be a P-channel FET that is conductive when no voltage is applied to its gate (e.g., similar to a normally-closed switch), and the NOT gate 324 may be omitted. Thus, at power up before the drive output 316 is asserted for the first time, the FET 322 will be conductive thus pulling down the gate output 300 to ensure the primary FET 114 is not inadvertently made conductive during power up of the controller 130.

The example control device 218 has three FETs 306, 308, and 310, and thus may implement three drive strengths as it relates to the conduction area of current from the drive rail 216 to the gate output 300. However, when implemented as shown in FIG. 3 (sometimes referred to as a totem pole driver), two or more transistors may be implement to enable a range of drive strengths available to the controller 130. Moreover, the rate of current flow provided to the gate output 300 is based not only on the conduction area implemented by the example FETs 306, 308, and 310, but also on the magnitude of the drive voltage applied to the drive rail 216. Thus, as alluded above, the implemented drive strength is also a function of the selected drive voltage applied to the drive rail 216 by the voltage regulator 206 (FIG. 2). Consider, as an example, that the control circuit 304 is designed and constructed to select a drive voltage from a set of three drive voltage (e.g., low, medium, and high). Thus, even when only the FET 306 is made conductive within the control device 218, the combination of the conduction area of the FET 306 and the three drive voltages results in three different and distinct drive strengths. When all three example FETs 306, 308, and 310 are considered with three example drive voltages, the controller 130 thus has nine drive strengths from which to choose for each assertion of gate output 300.

The control device 218 may be implemented in any suitable form, and FIG. 3 illustrates just one possible implementation in the form of a totem pole driver with three transistors. More transistors are possible, different types of transistors are possible (e.g., junction transistors), and combinations of transistor types. In other cases, rather than using transistors as electrically controlled switches, the control of the rate of current flow through the control device 218 may be implemented by driving one more transistors, of any suitable type, into their active regions as the mechanism to control or limit the rate of current flow to the gate output 300. With the benefit of this disclosure, and now understanding the example operation, one of ordinal skill could design many alternative arrangements for the control device 218 to perform the recited functions.

Figure 4:
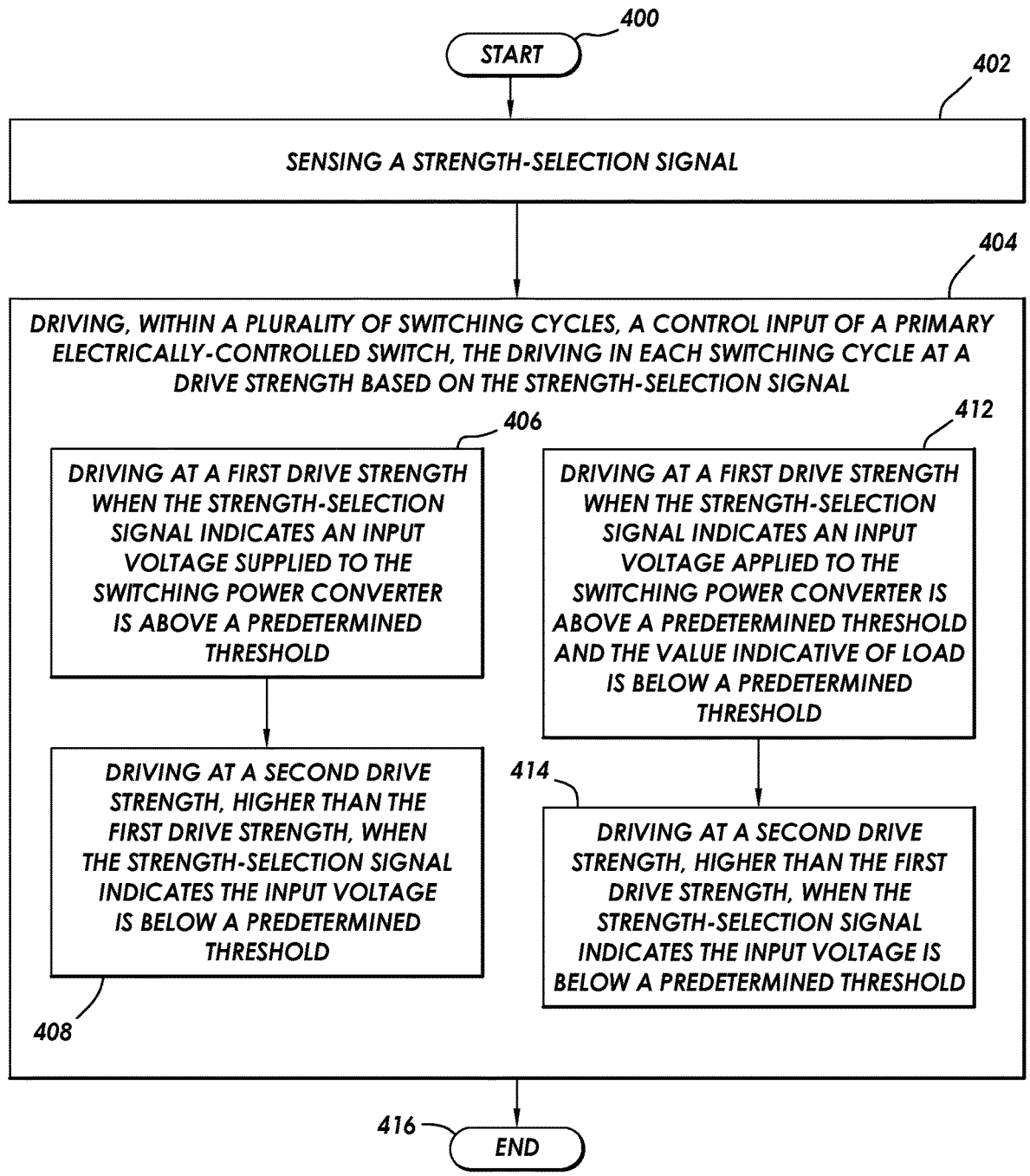
FIG. 4 shows, in a single drawing, multiple example methods, in accordance with at least some embodiments.

FIG. 4 shows, in a single drawing, three example methods, in accordance with at least some embodiments. In particular, the method starts (block 400) and comprises: sensing, by a controller of a switching power converter, a strength-selection signal (block 402); and driving, within a plurality of switching cycles, a control input of a primary electrically-controlled switch, the driving in each switching cycle at a drive strength based on the strength-selection signal (block 404). Driving the control input may take many suitable forms. In one example, driving the control input may comprise: driving at a first drive strength when the strength-selection signal indicates an input voltage supplied to the switching power converter is above a predetermined threshold (block 406); and driving at a second drive strength, higher than the first drive strength, when the strength-selection signal indicates the input voltage is below a predetermined threshold (block 408). In other cases, driving the control input may comprise: driving at a first drive strength when the strength-selection signal indicates an input voltage applied to the switching power converter is above a predetermined threshold and a load supplied by the switching power converter is below a predetermined threshold (block 412); and driving at a second drive strength, higher than the first drive strength, when the strength-selection signal indicates the input voltage is below a predetermined threshold (block 414). Thereafter, the method may end (block 416), likely to be repeated in the next switching cycle.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a switching power converter, the method comprising:
 sensing, by a controller of a switching power converter, an input voltage supplied to the switching power converter; and
 driving, by the controller within a plurality of switching cycles, a control input of a primary electrically-controlled switch, the driving in each switching cycle at a drive strength based on the input voltage,
 wherein driving the control input at the drive strength further comprises:
  driving at a first drive strength when the input voltage is above a predetermined threshold; and
  driving at a second drive strength, higher than the first drive strength, when the input voltage is below the predetermined threshold.

2. The method of claim 1 wherein the predetermined threshold is a first predetermined threshold, wherein driving the control input at the drive strength further comprises:
 driving at the first drive strength when a value indicative of load is below a second predetermined threshold; and
 driving at the second drive strength, higher than the first drive strength, when the value indicative of load is above the second predetermined threshold.

3. The method of claim 1 wherein the predetermined threshold is a first predetermined threshold, wherein driving the control input at the drive strength further comprises:
 driving at the first drive strength when the input voltage supplied to the switching power converter is above the first predetermined threshold and a value indicative of load is below a second predetermined threshold; and
 driving at the second drive strength, higher than the first drive strength, when the input voltage is below the first predetermined threshold.

4. The method of claim 1 wherein driving at the drive strength further comprises conducting current from a voltage rail through a conduction area, the conduction area selected by the controller based on the input voltage.

5. The method of claim 1 wherein driving at the drive strength further comprises conducting current from a voltage rail through a control device, wherein a voltage of the voltage rail is selected by the controller based on the input voltage.

6. A controller for a switching power converter, the controller comprising:
 a gate terminal and a sense terminal;
 a gate-drive controller coupled to the gate terminal and the sense terminal, wherein the gate-drive controller comprises:
  a first transistor having a first connection coupled to a voltage rail, a second connection coupled to the gate terminal, and a control input; and
  a second transistor having a first connection coupled to the voltage rail, a second connection coupled to the gate terminal, and a control input; and
 a PWM controller defining a gate output coupled to the gate-drive controller, and the PWM controller configured to assert and de-assert the gate output in each switching cycle of the switching power converter;
 wherein the gate-drive controller is configured to:
  sense, by way of the sense terminal or the gate terminal, a strength-selection signal; and
  drive, responsive to each assertion of the gate output, current to the gate terminal, the driving in each switching cycle at a drive strength based on the strength-selection signal,
 wherein when the gate-drive controller drives the gate terminal at the drive strength, the gate-drive controller is further configured to:
  assert the control input of both the first and second transistors when the strength-selection signal is below a predetermined threshold; and
  assert the control input the first transistor, and hold de-asserted the control input of the second transistor, when strength-selection signal is above the predetermined threshold.

7. The controller of claim 6 wherein when the gate-drive controller drives the gate terminal at the drive strength, the gate-drive controller is further configured to:
  drive at a first drive strength when the strength-selection signal indicates an input voltage supplied to the switching power converter is above a predetermined threshold; and
  drive at a second drive strength, higher than the first drive strength, when the strength-selection signal indicates the input voltage is below the predetermined threshold.

8. The controller of claim 6 wherein when the gate-drive controller drives the gate terminal at the drive strength, the gate-drive controller is further configured to:
  drive at a first drive strength when the strength-selection signal indicates a value indicative of load is below a predetermined threshold; and
  drive at a second drive strength, higher than the first drive strength, when the strength-selection signal indicates the value indicative of load is above the predetermined threshold.

9. The controller of claim 6 wherein when the gate-drive controller drives the gate terminal at the drive strength, the gate-drive controller is further configured to:
  drive at a first drive strength when the strength-selection signal indicates an input voltage supplied to the switching power converter is above a first predetermined threshold and a value indicative of load is below a second predetermined threshold; and
  drive at a second drive strength, higher than the first drive strength, when the strength-selection signal indicates the input voltage is below the first predetermined threshold.

10. The controller of claim 6 wherein when the gate-drive controller drives the gate terminal at the drive strength, the gate-drive controller is further configured to conduct current from a voltage rail through a conduction area, the conduction area selected by the gate-drive controller based on the strength-selection signal.

11. The controller of claim 6 further comprising the controller is configured to change a voltage on a voltage rail of the gate-drive controller based on the strength-selection signal.

12. A switching power converter comprising:
  a primary side comprising:
    a primary winding of a transformer, the primary winding defining a first lead coupled to an input voltage, and a second lead;
    a primary electrically-controlled switch having a control input, a first connection coupled to the second lead, and a second connection coupled to a reference voltage on the primary side;
  a secondary side comprising:
    a secondary winding of the transformer, the secondary winding defining a first lead coupled to a voltage output;
    a secondary rectifier associated with the secondary winding;
  a controller comprising:
    a gate-drive controller coupled to the control input of the primary electrically-controlled switch and the input voltage;
    a PWM controller defining a gate output coupled to the gate-drive controller, and the PWM controller configured to assert the gate output in each switching cycle of the switching power converter;
    wherein the gate-drive controller is configured to:
      sense a strength-selection signal; and
      drive, responsive to each assertion of the gate output, current to the control input of the primary electrically-controlled switch, the driving in each switching cycle at a drive strength based on the strength-selection signal.

13. The switching power converter of claim 12 wherein when the gate-drive controller drives the gate output at the drive strength, the gate-drive controller is further configured to:
  drive at a first drive strength when the strength-selection signal indicates the input voltage is above a predetermined threshold; and
  drive at a second drive strength, higher than the first drive strength, when the strength-selection signal indicates the input voltage is below the predetermined threshold.

14. The switching power converter of claim 12 wherein when the gate-drive controller drives the gate output at the drive strength, the gate-drive controller is further configured to:
  drive at a first drive strength when the strength-selection signal indicates a value indicative of load is below a predetermined threshold; and
  drive at a second drive strength, higher than the first drive strength, when the strength-selection signal indicates the value indicative of load is above the predetermined threshold.

15. The switching power converter of claim 12 wherein when the gate-drive controller drives the gate output at the drive strength, the gate-drive controller is further configured to:
  drive at a first drive strength when the strength-selection signal indicates the input voltage is above a first predetermined threshold and a value indicative of load is below a second predetermined threshold; and
  drive at a second drive strength, higher than the first drive strength, when the strength-selection signal indicates the input voltage is below the first predetermined threshold.

16. The switching power converter of claim 12 wherein when the gate-drive controller drives the control input at the drive strength, the gate-drive controller is further configured to conduct current from a voltage rail through a conduction area, the conduction area selected by the gate-drive controller based on the strength-selection signal.

17. The switching power converter of claim 12 wherein the gate-drive controller further comprises:
  a first transistor having a control input, a first connection coupled to a voltage rail, and a second connection coupled to the control input of the primary electrically-controlled switch;
  a second transistor having a control input, a first connection coupled to the voltage rail, a second connection coupled to the control input of the primary electrically-controlled switch;
  wherein when the gate-drive controller drives the control input of the primary electrically-controlled switch at the drive strength, the gate-drive controller is further configured to:
    assert the control input of both the first and second transistors when the strength-selection signal is below a predetermined threshold; and
    assert the control input the first transistor, and hold de-asserted the control input of the second transistor, when the strength-selection signal is above the predetermined threshold.

18. The switching power converter of claim 12 wherein the controller is configured to change a voltage on a voltage rail of the gate-drive controller based on the strength-selection signal.

19. The switching power converter of claim 12, wherein the gate-drive controller is further configured to set the drive strength to one of more than two levels based on the strength-selection signal.

20. The switching power converter of claim 12, wherein the gate-drive controller is further configured to set the drive strength indirectly proportional to the input voltage.

* * * * *